United States Patent
Fox et al.

(10) Patent No.: US 11,541,625 B2
(45) Date of Patent: Jan. 3, 2023

(54) WALL ASSEMBLY

(71) Applicant: BASF SE, Ludwigshafen am Rhein (DE)

(72) Inventors: Paul J. Fox, Saline, MI (US); Paul Campbell, Fort Mill, SC (US)

(73) Assignee: BASF SE, Ludwigshafen am Rhein (DE)

( * ) Notice: Subject to any disclaimer, the term of this patent is extended or adjusted under 35 U.S.C. 154(b) by 7 days.

(21) Appl. No.: 15/543,842

(22) PCT Filed: Jan. 19, 2016

(86) PCT No.: PCT/US2016/013884
§ 371 (c)(1),
(2) Date: Jul. 14, 2017

(87) PCT Pub. No.: WO2016/118493
PCT Pub. Date: Jul. 28, 2016

(65) Prior Publication Data
US 2017/0368785 A1    Dec. 28, 2017

Related U.S. Application Data

(60) Provisional application No. 62/104,948, filed on Jan. 19, 2015.

(51) Int. Cl.
*B32B 3/18* (2006.01)
*B32B 3/10* (2006.01)
(Continued)

(52) U.S. Cl.
CPC ................. *B32B 3/085* (2013.01); *B32B 3/08* (2013.01); *B32B 3/10* (2013.01); *B32B 3/18* (2013.01);
(Continued)

(58) Field of Classification Search
CPC .. B32B 3/085; B32B 3/08; B32B 3/10; B32B 3/18; B32B 5/18; B32B 2419/00;
(Continued)

(56) References Cited

U.S. PATENT DOCUMENTS 1,028,725 A    6/1912    Hodgson
1,549,292 A    8/1925    Buttress
(Continued)

FOREIGN PATENT DOCUMENTS

BE    1010844 A3    2/1999
CA    1 284 571 C    6/1991
(Continued)

OTHER PUBLICATIONS

First Examination Report dated Mar. 25, 2022, issued in corresponding Canadian Patent Application No. 2,973,733.
(Continued)

*Primary Examiner* — Phi Dieu Tran A
(74) *Attorney, Agent, or Firm* — DLA Piper LLP (US)

(57) ABSTRACT

A wall assembly is manufactured for supporting an exterior covering of a structure. The wall assembly includes a frame assembly including a top member and a bottom member spaced from the top member. The frame assembly further includes a plurality of vertical members spaced from each other and coupled to and extending between the top and bottom members. The plurality of vertical members each have an exterior surface configured to face an exterior of the structure. A rigid foam layer is directly coupled to the exterior surface of the plurality of vertical members. A sheathing layer is coupled to the rigid foam layer opposite the plurality of vertical members with the sheathing layer configured to receive the exterior covering.

16 Claims, 4 Drawing Sheets

(51) Int. Cl.
  *E04C 2/288* (2006.01)
  *B32B 5/18* (2006.01)
  *E04B 2/02* (2006.01)
  *B32B 3/08* (2006.01)
  *E04C 2/38* (2006.01)

(52) U.S. Cl.
  CPC .............. *B32B 5/18* (2013.01); *E04C 2/288* (2013.01); *E04C 2/386* (2013.01); *B32B 2419/00* (2013.01); *B32B 2607/00* (2013.01); *E04B 2/02* (2013.01); *E04B 2002/0273* (2013.01)

(58) Field of Classification Search
  CPC ..... B32B 2607/00; E04C 2/288; E04C 2/386; E04B 2/02; E04B 2002/0273; E04B 2002/0276; E04B 2/562
  See application file for complete search history.

(56) References Cited

U.S. PATENT DOCUMENTS

| | | |
|---|---|---|
| 1,637,410 A | 8/1927 | Coryell |
| 1,914,345 A | 6/1933 | Roos |
| 2,015,817 A | 10/1935 | Schmidt |
| 2,116,270 A | 5/1938 | LeGrand |
| 2,318,820 A | 5/1943 | Voigt et al. |
| 2,324,971 A | 7/1943 | Woodward |
| 2,514,170 A | 7/1950 | Walter et al. |
| 2,553,881 A | 5/1951 | Suttles |
| 2,645,824 A | 7/1953 | Titsworth |
| 2,755,728 A | 7/1956 | Frisby |
| 2,767,961 A | 10/1956 | Frankland |
| 2,876,871 A | 3/1959 | Coffman et al. |
| 3,006,113 A | 10/1961 | Bames et al. |
| 3,086,323 A | 4/1963 | Pine |
| 3,115,819 A | 12/1963 | Mahlmeister et al. |
| 3,147,336 A | 9/1964 | Mathews |
| 3,196,773 A | 7/1965 | Lorenz et al. |
| 3,251,163 A | 5/1966 | Russell |
| 3,258,889 A * | 7/1966 | Butcher .................. E04C 2/386 52/309.11 |
| 3,295,278 A | 1/1967 | Muhm |
| 3,343,474 A | 9/1967 | Sohda et al. |
| 3,368,473 A | 2/1968 | Sohda et al. |
| 3,482,367 A | 12/1969 | Curran |
| 3,595,728 A | 7/1971 | Robson |
| 3,605,365 A | 9/1971 | Hastings |
| 3,616,139 A | 10/1971 | Jones |
| 3,633,659 A | 1/1972 | Ohlsson |
| 3,683,785 A | 8/1972 | Grange |
| 3,736,715 A | 6/1973 | Krumwiede |
| 3,748,803 A | 7/1973 | Widerby et al. |
| 3,756,895 A | 9/1973 | Bellamy |
| 3,780,638 A | 12/1973 | Burghartz et al. |
| 3,783,563 A | 1/1974 | Moore |
| 3,785,913 A * | 1/1974 | Hallamore .............. E04C 2/384 428/71 |
| 3,789,747 A | 2/1974 | Wasserman et al. |
| 3,797,180 A | 3/1974 | Grange |
| 3,816,234 A | 6/1974 | Winfield |
| 3,868,796 A | 3/1975 | Bush |
| 3,885,008 A | 5/1975 | Martin |
| 3,952,471 A | 4/1976 | Mooney |
| 3,972,164 A | 8/1976 | Grange |
| 3,982,360 A | 9/1976 | Newman |
| 4,019,297 A | 4/1977 | Murphy |
| 4,028,289 A | 6/1977 | Brown |
| 4,047,355 A | 9/1977 | Knorr |
| 4,057,123 A | 11/1977 | Erickson |
| 4,067,155 A | 1/1978 | Ruff et al. |
| 4,068,434 A * | 1/1978 | Day ........................ E04C 2/243 52/220.1 |
| 4,069,628 A | 1/1978 | Kreimer |
| 4,080,881 A | 3/1978 | Campbell |
| 4,096,790 A | 6/1978 | Curran |
| 4,099,355 A | 7/1978 | Strunk |
| 4,102,092 A | 7/1978 | Ward |
| 4,104,840 A | 8/1978 | Heintz et al. |
| 4,125,971 A | 11/1978 | Ward |
| 4,177,618 A * | 12/1979 | Felter .................... E04F 21/085 52/105 |
| 4,185,437 A | 1/1980 | Robinson |
| 4,201,121 A | 5/1980 | Brandenburg, Jr. |
| 4,214,510 A | 7/1980 | Ward |
| 4,223,489 A | 9/1980 | Bentley |
| 4,237,672 A | 12/1980 | Peterson |
| 4,254,598 A | 3/1981 | Rugroden |
| 4,286,420 A | 9/1981 | Pharmakidis |
| 4,295,304 A | 10/1981 | Kim |
| 4,308,308 A | 12/1981 | Sachse |
| 4,333,290 A | 6/1982 | Koberstein |
| 4,344,413 A | 8/1982 | Watkins et al. |
| 4,346,541 A | 8/1982 | Schmitt |
| 4,382,435 A | 5/1983 | Brill-Edwards |
| 4,397,122 A | 8/1983 | Cros |
| 4,429,503 A | 2/1984 | Holliday |
| 4,446,661 A | 5/1984 | Jonsson et al. |
| 4,453,359 A | 6/1984 | Robinson |
| 4,471,591 A * | 9/1984 | Jamison .................... E04B 1/10 264/46.4 |
| 4,587,164 A * | 5/1986 | Freeman .................. E04B 7/22 428/314.4 |
| 4,593,511 A | 6/1986 | Hakasaari |
| 4,635,419 A | 1/1987 | Forrest |
| 4,637,190 A | 1/1987 | Minialoff et al. |
| 4,641,469 A | 2/1987 | Wood |
| 4,646,498 A * | 3/1987 | Schneller ................. E04B 2/92 52/309.12 |
| 4,660,463 A | 4/1987 | Bottomore et al. |
| 4,661,533 A | 4/1987 | Stobby |
| 4,677,903 A | 7/1987 | Mathews, III |
| 4,683,688 A | 8/1987 | Wojcinski |
| 4,698,366 A | 10/1987 | Laan |
| 4,736,561 A | 4/1988 | Lehr et al. |
| 4,754,587 A | 7/1988 | Glaser |
| 4,786,547 A * | 11/1988 | St-Michel ............... B32B 21/02 428/215 |
| 4,832,308 A | 5/1989 | Slonimsky et al. |
| 4,852,314 A | 8/1989 | Moore, Jr. |
| 4,858,403 A | 8/1989 | Lingle |
| 4,916,875 A | 4/1990 | Kashiwagi |
| 4,942,711 A | 7/1990 | Bergquist |
| 4,960,184 A | 10/1990 | Woodward et al. |
| 4,969,302 A * | 11/1990 | Coggan ............... E04F 13/0864 52/309.8 |
| 4,995,308 A | 2/1991 | Waggoner |
| 5,009,043 A | 4/1991 | Kurrasch |
| 5,033,248 A | 7/1991 | Phillips |
| 5,102,260 A | 4/1992 | Horvath et al. |
| 5,172,532 A | 12/1992 | Gibbar, Jr. |
| 5,192,598 A * | 3/1993 | Forte ........................ B32B 5/18 428/76 |
| 5,224,315 A | 7/1993 | Winter, IV |
| 5,279,089 A | 1/1994 | Gulur |
| 5,293,728 A | 3/1994 | Christopher et al. |
| 5,327,699 A | 7/1994 | Khan et al. |
| 5,341,612 A | 8/1994 | Robbins |
| 5,353,563 A * | 10/1994 | White ...................... E04C 2/24 52/309.13 |
| 5,373,678 A | 12/1994 | Hesser |
| 5,425,207 A | 6/1995 | Shayman |
| 5,425,908 A | 6/1995 | Merser |
| 5,426,908 A | 6/1995 | Shayman |
| 5,433,050 A | 7/1995 | Wilson et al. |
| 5,473,847 A | 12/1995 | Crookston |
| 5,487,247 A | 1/1996 | Pigg |
| 5,497,589 A | 3/1996 | Porter |
| 5,509,242 A | 4/1996 | Rechsteiner et al. |
| 5,522,195 A | 6/1996 | Bargen |
| 5,526,629 A | 6/1996 | Cavaness |
| 5,533,311 A | 7/1996 | Tirrell et al. |
| 5,596,847 A | 1/1997 | Stephenson |

(56) References Cited

U.S. PATENT DOCUMENTS

| | | | |
|---|---|---|---|
| 5,600,928 A | 2/1997 | Hess et al. | |
| 5,612,117 A | 3/1997 | Belanger et al. | |
| 5,644,878 A | 7/1997 | Wehrmann | |
| 5,743,055 A | 4/1998 | Conner et al. | |
| 5,758,463 A | 6/1998 | Mancini, Jr. | |
| 5,761,864 A | 6/1998 | Nonoshita | |
| 5,765,330 A * | 6/1998 | Richard | E04B 1/14 52/265 |
| 5,766,071 A | 6/1998 | Kirkwood | |
| 5,771,645 A | 6/1998 | Porter | |
| 5,771,654 A | 6/1998 | Moore et al. | |
| 5,787,665 A | 8/1998 | Carlin et al. | |
| 5,806,264 A | 9/1998 | Boot | |
| 5,819,496 A * | 10/1998 | Sperber | E04B 1/7604 52/742.13 |
| 5,860,259 A | 1/1999 | Laska | |
| 5,884,446 A | 3/1999 | Hageman | |
| 5,910,082 A | 6/1999 | Bender et al. | |
| 5,943,775 A | 8/1999 | Lanahan et al. | |
| 5,953,883 A | 9/1999 | Ojala | |
| 6,026,629 A | 2/2000 | Strickland et al. | |
| 6,032,434 A | 3/2000 | Graf | |
| 6,041,561 A | 3/2000 | LeBlang | |
| 6,061,973 A | 5/2000 | Accardi et al. | |
| 6,061,978 A | 5/2000 | Dinwoodie et al. | |
| 6,067,770 A | 5/2000 | Lubker, II et al. | |
| 6,085,469 A | 7/2000 | Wolfe | |
| 6,085,485 A | 7/2000 | Murdock | |
| 6,088,992 A | 7/2000 | Nunley | |
| 6,099,768 A | 8/2000 | Strickland et al. | |
| 6,122,879 A | 9/2000 | Montes | |
| 6,141,932 A | 11/2000 | Tarrant | |
| 6,185,895 B1 | 2/2001 | Rettew | |
| 6,212,837 B1 | 4/2001 | Davis et al. | |
| 6,220,956 B1 | 4/2001 | Kilian et al. | |
| 6,226,943 B1 * | 5/2001 | Grinshpun | E04C 2/386 52/309.4 |
| 6,279,287 B1 | 8/2001 | Meadows | |
| 6,279,290 B1 | 8/2001 | Richardson | |
| 6,279,293 B1 | 8/2001 | Ojala | |
| 6,280,669 B2 | 8/2001 | Kistner et al. | |
| 6,305,142 B1 | 10/2001 | Brisson et al. | |
| 6,383,652 B1 | 5/2002 | Templeton et al. | |
| 6,401,417 B1 | 6/2002 | Leblang | |
| 6,415,580 B2 | 7/2002 | Ojala | |
| 6,519,904 B1 | 2/2003 | Phillips | |
| 6,571,523 B2 | 6/2003 | Chambers | |
| 6,588,172 B2 | 7/2003 | Porter | |
| 6,589,660 B1 | 7/2003 | Templeton et al. | |
| 6,619,008 B1 | 9/2003 | Shivak et al. | |
| 6,688,059 B1 | 2/2004 | Walker | |
| 6,688,073 B2 | 2/2004 | VanderWerf et al. | |
| 6,715,249 B2 | 4/2004 | Rusek et al. | |
| 6,729,094 B1 | 5/2004 | Spencer et al. | |
| 6,772,569 B2 | 8/2004 | Bennett et al. | |
| 6,780,099 B1 | 8/2004 | Harper | |
| 6,789,645 B1 | 9/2004 | Deblander | |
| 6,802,157 B2 | 10/2004 | Hallsten | |
| 6,854,230 B2 | 2/2005 | Starke | |
| 6,869,661 B1 | 3/2005 | Ahr | |
| 6,886,301 B2 | 5/2005 | Schilger | |
| 6,941,706 B2 | 9/2005 | Austin et al. | |
| 7,143,557 B1 | 12/2006 | Ayers, Jr. | |
| 7,165,369 B2 | 1/2007 | Jandl | |
| 7,168,216 B2 * | 1/2007 | Hagen, Jr. | B29C 44/186 52/480 |
| 7,247,090 B2 | 7/2007 | Vacek | |
| 7,398,856 B2 | 7/2008 | Foster et al. | |
| 7,406,806 B2 * | 8/2008 | Hallissy | E04B 1/98 52/309.7 |
| 7,543,419 B2 | 6/2009 | Rue | |
| 7,574,837 B2 | 8/2009 | Hagen, Jr. et al. | |
| 7,591,109 B2 | 9/2009 | Rotter | |
| 7,610,729 B1 | 11/2009 | Ayers, Jr. | |
| 7,712,276 B2 | 5/2010 | Gilbert et al. | |
| 7,735,267 B1 | 6/2010 | Ayers, Jr. | |
| 7,749,598 B2 | 7/2010 | Agrawal | |
| 7,765,750 B2 | 8/2010 | Duncan | |
| 7,765,756 B2 | 8/2010 | Bontrager, II | |
| 7,810,296 B1 | 10/2010 | Turku | |
| 7,818,922 B2 | 10/2010 | Ellis | |
| 7,926,233 B2 | 4/2011 | Schiffmann et al. | |
| 7,946,384 B2 | 5/2011 | Foster et al. | |
| 8,024,894 B1 | 9/2011 | Ayers, Jr. | |
| 8,100,341 B1 | 1/2012 | Roderick et al. | |
| 8,104,245 B2 | 1/2012 | Whelan et al. | |
| 8,122,664 B2 | 2/2012 | Ben-Daat et al. | |
| 8,122,666 B2 | 2/2012 | Gupta | |
| 8,137,170 B2 | 3/2012 | Klement | |
| 8,152,608 B1 | 4/2012 | Hamby | |
| 8,176,699 B1 | 5/2012 | Birchfield | |
| 8,178,643 B2 | 5/2012 | Edstrom et al. | |
| 8,209,915 B2 * | 7/2012 | O'Leary | E04B 1/625 52/61 |
| 8,240,103 B2 | 8/2012 | Riepe | |
| 8,245,947 B2 | 8/2012 | Roderick et al. | |
| 8,453,404 B2 | 6/2013 | Cox | |
| 8,613,180 B2 | 12/2013 | Strickland et al. | |
| 8,695,299 B2 | 4/2014 | Propst | |
| 8,696,966 B2 * | 4/2014 | Smith | B29C 39/10 264/261 |
| 8,745,950 B2 | 6/2014 | Ito et al. | |
| 8,793,952 B2 * | 8/2014 | Olang | E04F 21/085 52/309.4 |
| 8,875,472 B2 * | 11/2014 | Korwin-Edson | E04B 1/7604 52/745.21 |
| 8,925,270 B2 | 1/2015 | Grisolia et al. | |
| 8,966,845 B1 * | 3/2015 | Ciuperca | E04B 1/80 52/309.12 |
| 9,523,195 B2 * | 12/2016 | Nandi | C08G 18/163 |
| 9,562,359 B1 * | 2/2017 | Grisolia | E04F 13/04 |
| 9,702,152 B2 * | 7/2017 | Sievers | E04C 2/386 |
| 10,370,849 B2 * | 8/2019 | Lambach | E04C 2/386 |
| 10,801,197 B2 * | 10/2020 | Fox | E04C 2/386 |
| 2002/0020129 A1 | 2/2002 | Winter | |
| 2003/0126806 A1 | 7/2003 | Ellis | |
| 2003/0150183 A1 | 8/2003 | Egan | |
| 2003/0172613 A1 | 9/2003 | Fontana et al. | |
| 2004/0000113 A1 | 1/2004 | Alderman | |
| 2004/0148889 A1 * | 8/2004 | Bibee | E04B 1/78 52/481.1 |
| 2005/0055982 A1 | 3/2005 | Medina | |
| 2005/0072072 A1 | 4/2005 | Duncan et al. | |
| 2005/0076600 A1 | 4/2005 | Moody et al. | |
| 2005/0144900 A1 | 7/2005 | Hallissy et al. | |
| 2005/0163881 A1 | 7/2005 | Pierick et al. | |
| 2005/0166496 A1 | 8/2005 | Farag | |
| 2005/0188649 A1 | 9/2005 | Hagen | |
| 2005/0204697 A1 | 9/2005 | Rue | |
| 2005/0204699 A1 | 9/2005 | Rue | |
| 2005/0255318 A1 | 11/2005 | Czemy | |
| 2006/0068188 A1 | 3/2006 | Morse et al. | |
| 2006/0117689 A1 | 6/2006 | Onken et al. | |
| 2006/0185267 A1 | 8/2006 | Tonyan et al. | |
| 2006/0201089 A1 | 9/2006 | Duncan et al. | |
| 2006/0218869 A1 | 10/2006 | Ellis | |
| 2006/0251851 A1 | 11/2006 | Bowman | |
| 2006/0260267 A1 | 11/2006 | Hagen et al. | |
| 2007/0034110 A1 | 2/2007 | Zupancich et al. | |
| 2007/0062151 A1 | 3/2007 | Smith | |
| 2007/0234649 A1 | 10/2007 | Near et al. | |
| 2007/0234667 A1 | 10/2007 | Lubker et al. | |
| 2007/0294976 A1 | 12/2007 | Fay | |
| 2008/0047217 A1 | 2/2008 | Browning et al. | |
| 2008/0193712 A1 | 8/2008 | Desjardins | |
| 2008/0260993 A1 | 10/2008 | Koester | |
| 2008/0295450 A1 | 12/2008 | Yogev | |
| 2009/0056255 A1 | 3/2009 | Barton | |
| 2009/0100780 A1 | 4/2009 | Mathis et al. | |
| 2009/0107065 A1 | 4/2009 | LeBlang | |
| 2009/0239059 A1 | 9/2009 | Kipp et al. | |
| 2009/0255201 A1 | 10/2009 | Kraus, Jr. et al. | |
| 2009/0308001 A1 | 12/2009 | Wu et al. | |

(56) References Cited

U.S. PATENT DOCUMENTS

| | | |
|---|---|---|
| 2010/0058700 A1 | 3/2010 | LeBlang |
| 2010/0095613 A1 | 4/2010 | Paetkau et al. |
| 2010/0107539 A1 | 5/2010 | Martens et al. |
| 2010/0269439 A1 | 10/2010 | Morrisette |
| 2010/0307089 A1 | 12/2010 | Cox |
| 2011/0024050 A1 | 2/2011 | Booth et al. |
| 2011/0036030 A1 | 2/2011 | Hegland |
| 2011/0047908 A1 | 3/2011 | Brusman et al. |
| 2011/0094175 A1 | 4/2011 | Groft |
| 2011/0107723 A1 | 5/2011 | Hurlburt |
| 2011/0239574 A1 | 10/2011 | Morris et al. |
| 2011/0258944 A1 | 10/2011 | Radoane |
| 2011/0296794 A1 | 12/2011 | Thomas et al. |
| 2011/0314759 A1 | 12/2011 | McCullough |
| 2012/0011792 A1 | 1/2012 | DeWildt et al. |
| 2012/0100289 A1 | 4/2012 | Egan et al. |
| 2012/0151869 A1 | 6/2012 | Miller |
| 2012/0317923 A1 | 12/2012 | Herdt et al. |
| 2013/0019549 A1 | 1/2013 | Henriquez |
| 2013/0067841 A1 | 3/2013 | Grieco et al. |
| 2013/0081346 A1 | 4/2013 | Kulprathipanja et al. |
| 2013/0104480 A1* | 5/2013 | Smith ............... B29C 39/10 52/309.7 |
| 2013/0209782 A1 | 8/2013 | Kipp et al. |
| 2014/0033627 A1 | 2/2014 | Stephens, Jr. et al. |
| 2014/0053486 A1 | 2/2014 | Grisolia et al. |
| 2014/0115988 A1 | 5/2014 | Sievers et al. |
| 2014/0115989 A1 | 5/2014 | Sievers et al. |
| 2014/0115991 A1 | 5/2014 | Sievers et al. |
| 2014/0174011 A1 | 6/2014 | Smith |
| 2015/0376898 A1* | 12/2015 | Kreizinger ........... E04C 2/284 52/483.1 |
| 2016/0186427 A1* | 6/2016 | Castelle ............... B32B 7/05 52/309.3 |
| 2017/0096819 A1* | 4/2017 | Grisolia ............ E04F 13/047 |
| 2017/0260738 A1* | 9/2017 | Harrison ............... B32B 7/08 |
| 2018/0030721 A1* | 2/2018 | Ciuperca ............ E04B 1/625 |

FOREIGN PATENT DOCUMENTS

| | | | |
|---|---|---|---|
| CA | 2 006 652 A1 | 6/1991 | |
| CA | 2 097 788 A1 | 12/1993 | |
| CA | 2 081 651 A1 | 4/1994 | |
| CA | 2 019 852 C | 8/1995 | |
| CA | 2 174 573 C | 6/1999 | |
| CZ | 302477 B6 | 6/2011 | |
| DE | 1 281 133 B | 10/1968 | |
| EP | 0 004 216 A1 | 9/1979 | |
| EP | 0 111 235 A2 | 6/1984 | |
| EP | 0 191 709 A1 | 8/1986 | |
| EP | 0 553 414 A1 | 8/1993 | |
| EP | 2 333 474 A2 | 6/2011 | |
| ES | 2 351 467 A1 | 2/2011 | |
| FR | 2366508 A1 * | 4/1978 | ............ F16L 59/143 |
| FR | 2 421 344 A1 | 10/1979 | |
| FR | 2 481 341 A1 | 10/1981 | |
| FR | 2 576 943 A1 | 8/1986 | |
| GB | 1 097 452 A | 1/1968 | |
| GB | 1 196 469 A | 6/1970 | |
| GB | 2 145 756 A | 4/1985 | |
| GB | 2 196 032 A | 4/1988 | |
| JP | H 06-185130 A | 7/1994 | |
| NZ | 1020177 C2 | 9/2003 | |
| SU | 775258 A1 | 10/1980 | |
| WO | WO-9946116 A1 * | 9/1999 | ............... B32B 5/22 |
| WO | WO 01/83911 A1 | 11/2001 | |
| WO | WO 2005/103407 A2 | 11/2005 | |
| WO | WO 2006/028698 A1 | 3/2006 | |
| WO | WO 2011/003143 A1 | 1/2011 | |
| WO | WO 2012/027353 A2 | 3/2012 | |
| WO | WO 2012/174408 A2 | 12/2012 | |
| WO | WO 2016/118490 A1 | 7/2016 | |

OTHER PUBLICATIONS

International Search Report for Application No. PCT/US2012/042667 dated Sep. 7, 2012, 4 pages.
International Search Report for Application No. PCT/US2012/042751 dated Sep. 13, 2012, 3 pages.
International Search Report for Application No. PCT/US2012/042718 dated Sep. 17, 2012, 3 pages.
International Search Report for Application No. PCT/US2016/013884 dated Apr. 6, 2016, 2 pages.
International Search Report for Application No. PCT/US2016/013880 dated Apr. 6, 2016, 2 pages.
Nu-Tech Building Systems, "Modular Wall Panel Technology", downloaded from http://www.nu-techbuildingsystems.com/modular_panel_technology.php on Aug. 23, 2010, pp. 1-7.
McGraw Hill, "Handbook of Adhesives and Sealants: Chapter 8: Adhesive Classifications", 2000, pp. 279-317.
McGraw Hill, "Handbook of Adhesives and Sealants: Chapter 10: Adhesive Families", 2000, pp. 343-414.
McGraw Hill, Handbook of Adhesives and Sealants: Chapter 12: Sealant Classification and Composition, 2000, pp. 451-474.
McGraw Hill, "Handbook of Adhesives and Sealants: Chapter 13: Sealant Families", 2000, pp. 475-499.
English language abstract and machine-assisted English translation for BE 1010844 extracted from espacenet.com database on Jul. 31, 2017, 13 pages.
English language abstract for CZ 302 477 extracted from espacenet.com database on May 12, 2014, 2 pages.
Machine-assisted English translation for DE 1 281 133 extracted from espacenet.com database on Apr. 30, 2014, 6 pages.
English language abstract for EP 0 004 216 extracted from espacenet.com database on May 12, 2014, 2 pages.
English language abstract and machine-assisted English translation for EP 0 111 235 extracted from espacenet.com database on Apr. 30, 2014, 8 pages.
English language abstract and machine-assisted English translation for EP 0 191 709 extracted from espacenet.com database on Apr. 30, 2014, 15 pages.
Machine-assisted English translation for ES 2 351 467 extracted from espacenet.com database on Apr. 30, 2014, 8 pages.
English language abstract and machine-assisted English translation for FR 2 421 344 extracted from espacenet.com database on Apr. 30, 2014, 6 pages.
English language abstract and machine-assisted English translation for FR 2 481 341 extracted from espacenet.com database on Apr. 30, 2014, 6 pages.
Machine-assisted English translation for FR 2 576 943 extracted from espacenet.com database on Apr. 30, 2014, 17 pages.
English language abstract and machine-assisted English translation for JPH 06-185130 exuacted from espacenet.com database on May 12, 2014, 8 pages.
English language abstract for NL 1020177 extracted from espacenet.com database on Apr. 30, 2014, 1 page.
Machine-assisted English translation for SU 775258 extracted from espacenet.com database on Apr. 30, 2014, 5 pages.

* cited by examiner

WALL ASSEMBLY

CROSS-REFERENCE TO RELATED APPLICATION(S)

The present application is the National Stage of International Patent Application No. PCT/US2016/013884, filed on Jan. 19, 2016, which claims the benefit of pending U.S. Provisional Patent Application, Ser. No. 62/104,948, filed Jan. 19, 2015, the entire disclosure of which is hereby incorporated by reference.

BACKGROUND OF THE INVENTION

1. Field of the Invention

The present invention generally relates to a wall assembly.

2. Description of the Related Art

Wall assemblies for use as walls of a building, such as residential buildings, or commercial buildings, are known in the art. The conventional wall assembly includes a frame assembly. Generally, a sheathing layer is applied to the frame assembly and an exterior rigid foam layer is applied to the exterior of the sheathing layer. Because the exterior rigid foam layer is on the exterior of the sheathing layer, the exterior rigid foam layer may become damaged during handling and installation of the wall assembly. Additionally, because the sheathing layer is directly connected to the frame assembly and is between the exterior rigid foam layer and any interior rigid foam layer, the wall assembly lacks a thermal break to prevent the flow of thermal energy from the sheathing layer through the frame assembly.

With the ever increasing demands for energy efficient buildings, there is a need to provide an improved wall assembly that provides a sufficient minimum thermal resistance value (R-value) while meeting the strength requirements to handle shear loads that may act on the wall assembly.

SUMMARY OF THE INVENTION AND ADVANTAGES

A wall assembly is manufactured for supporting an exterior coving of a structure. The wall assembly includes a frame assembly. The frame assembly includes a top member having a top interior surface configured to face an interior of the structure and a top exterior surface configured to face an exterior of the structure. The frame assembly also includes a bottom member spaced from the top member. The bottom member has a bottom interior surface configured to face the interior of the structure and a bottom exterior surface configured to face the exterior of the structure. The frame assembly further includes a plurality of vertical members spaced from each other and coupled to and extending between the top and bottom members. The plurality of vertical members each have an outer surface configured to face the exterior of the structure. A rigid foam layer is directly coupled to the outer surface of the plurality of vertical members. A sheathing layer is coupled to the rigid foam layer opposite the plurality of vertical members with the sheathing layer configured to receive the exterior covering. Because the rigid foam layer is between the sheathing layer and the frame assembly, the rigid foam layer provides a thermal break between the sheathing layer and the frame assembly within the wall assembly. Additionally, because the sheathing layer is coupled to the rigid foam layer, the sheathing layer increases a strength of the wall assembly.

Additionally, a method of manufacturing the wall assembly is disclosed.

BRIEF DESCRIPTION OF THE DRAWINGS

Other advantages of the present invention will be readily appreciated, as the same becomes better understood by reference to the following detailed description, when considered in connection with the accompanying drawings wherein.

DETAILED DESCRIPTION OF THE EXEMPLARY EMBODIMENT

Figure 1:
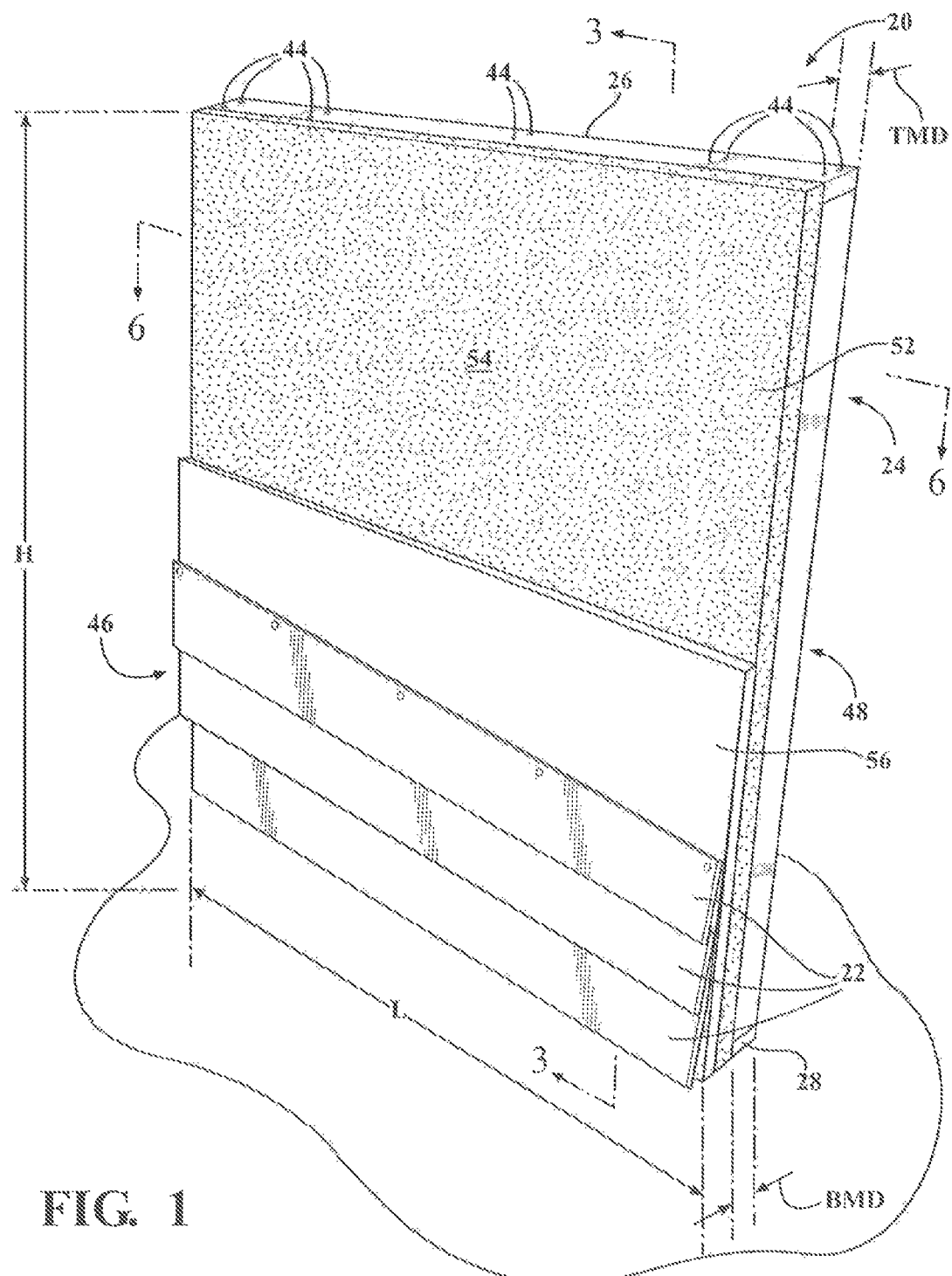
FIG. 1 is a perspective view of an exterior face of a wall assembly having a frame assembly, a rigid foam layer, a sheathing layer, and an exterior covering.

Referring to the Figures, wherein like numerals indicate corresponding parts throughout the several views, a wall assembly is generally shown at 20. The wall assembly 20 is for constructing a building, such as a residential building or a commercial building. For example, the wall assembly 20 is at least one of a plurality of exterior walls of the building. It is to be appreciated that the wall assembly 20 may only be one of the plurality of exterior walls of the building or the wall assembly 20 may be all of the plurality of exterior walls of the building. Said differently, the wall assembly 20 may be used to construct a single exterior wall of the building.

Alternatively, multiple wall assemblies 20 may be used to construct the exterior walls of building. Said differently, the wall assembly 20 may be coupled to another wall assembly 20 to define a perimeter of the building. Additionally, the wall assembly 20 may be coupled to a traditional field constructed wall to define the perimeter of the building. It is to be appreciated that the wall assembly 20 may be coupled to the traditional field constructed wall or the another wall assembly 20 by any suitable methods. For example, fasteners 44, such as nails or screws, an adhesive bead, bolts, cam locks, or straps could be used to the couple together the adjacent wall assemblies 20.

The wall assembly 20 can be manufactured in any length L or height H desired for use as the exterior walls of the building. Additionally, the wall assembly 20 may be used completely above grade or extend below grade such that a portion of the wall assembly 20 is embedded within the ground. Furthermore, the wall assembly 20 can be used as interior walls of the building.

The wall assembly 20 may be manufactured by assembling the wall assembly 20 off-site from the location of the building. Said differently, the wall assembly 20 may be manufactured at a location that is different from the location that the building is to be constructed. For example, the wall assembly 20 can be manufactured at a factory or a warehouse and subsequently transported to the location that the building is to be constructed. Once the wall assembly 20 is delivered on-site, the wall assembly 20 is secured in position on a support structure of the building, such as a footer or stem wall, foundation wall, first, second, or third floor walls, and/or another wall assembly 20.

Alternatively, the wall assembly 20 may be manufactured on-site at the location where the building is to be constructed. It is to be appreciated that the wall assembly 20 may be positioned with the assistance of machinery, such as a crane. Typically, once the wall assembly 20 is secured in position, the wall assembly 20 receives an exterior covering 22 of the building. The exterior covering 22 may be a typical cladding such as siding, brick, stucco, cultured stone, fiber cement, wood, insulating foam panel, vinyl, and combinations thereof. However, it is to be appreciated that the wall assembly 20 may receive the exterior covering 22 prior to arriving on-site, i.e., in the factor or the warehouse. The exterior covering 22 may be secured to the wall assembly 20 by exterior fasteners 44, such as nails, screws, or ties. For example, when the exterior covering 22 is brick, the wall assembly 20 may include brick ties as the exterior fasteners 44. Alternatively, the exterior covering 22 may be secured to the wall assembly 20 by an adhesive. For example, when the exterior covering 22 is siding, panels of the siding may be adhesively bonded to the wall assembly 20.

It is to be appreciated that the exterior covering 22 is the outermost layer of the wall assembly 20, once the wall is completed. For example, when the wall assembly 20 is assembled without the exterior covering 22, it is understood that the wall assembly 20 is not complete. Once the exterior covering 22 is added to the wall assembly 20, the wall assembly 20 is deemed complete.

Figure 2:
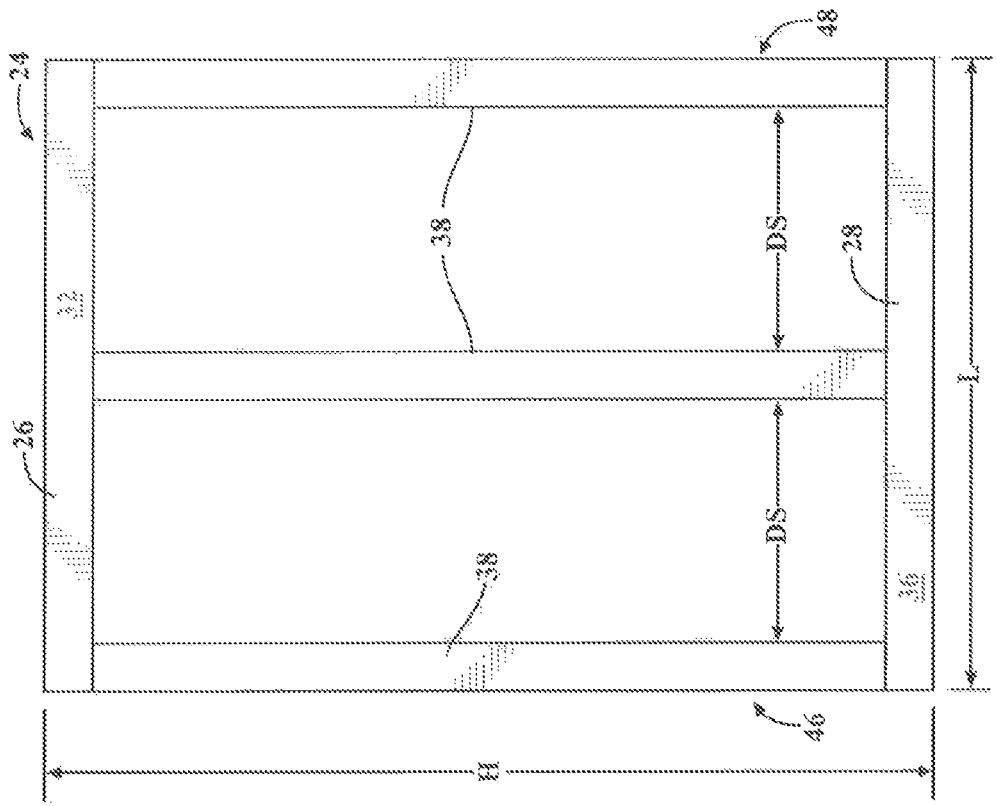
FIG. 2 is a front view of the frame assembly showing a top member, a bottom member, and vertical members.

With reference to FIGS. 1 and 2, the wall assembly 20 includes a frame assembly 24. The frame assembly 24 includes a top member 26 and a bottom member 28 spaced from the top member 26. Generally, the top and bottom members 26, 28 extend horizontally when the wall assembly 20 is installed.

The top member 26 has a top interior surface 30 configured to face an interior of the structure and a top exterior surface 32 configured to face the exterior of the structure. Said differently, the top interior surface 30 of the top member 26 is configured to face the inside of the building or structure. The top exterior surface 32 of the top member 26 is configured face the outside of the building or structure. A top member depth TMD of the top member 26 is defined between the top interior surface 30 and the top exterior surface 32 of the top member 26.

As described above, the bottom member 28 is spaced from the top member 26. Generally, the top and bottom members 26, 28 are substantially parallel with each other. Similar to the top member 26, the bottom member 28 has a bottom interior surface 34 configured to face the interior of the structure and a bottom exterior surface 36 configured to face the exterior of the structure. A bottom member depth BMD of the bottom member 28 is defined between the bottom interior surface 34 and the bottom exterior surface 36 of the bottom member 28.

The frame assembly 24 also includes a plurality of vertical members 38 spaced from each other and coupled to and extending between the top and bottom members 26, 28. Each of the vertical members 38 has a vertical interior surface 40 configured to face an interior of the structure and a vertical exterior surface 42 configured to face the exterior of the structure. A vertical member depth VMD is defined between the vertical interior surface 40 and the vertical exterior surface 42 of the vertical members 38.

Collectively, the top exterior surface 32 of the top member 26, the bottom exterior surface 36 of the bottom member 28, and the vertical exterior surface 42 of the vertical members 38 present an exterior face of the frame assembly 24. Likewise, the top interior surface 30 of the top member 26, the bottom interior surface 34 of the bottom member 28, and the vertical interior surface 40 of the vertical members 38 collectively present an interior face of the frame assembly 24. Generally, when the wall assembly 20 is secured in position on the support structure of the building, the interior face of the frame assembly 24 faces the interior of the building and the exterior face of the frame assembly 24 faces the exterior of the building. Typically, the bottom member 28 is secured in position on the support structure of the building. The frame assembly 24 may also include a structural support member for providing resistance to axial loads, shear loads, and lateral loads applied to the wall assembly 20. For example, the frame assembly 24 may include wind bracing, hurricane straps, and/or up-lifting clips.

Generally, the top and bottom members 26, 28 are horizontal and the vertical members 38 are perpendicular to the top and bottom members 26, 28. However, it is to be appreciated that the top and bottom members 26, 28 may be vertical with the vertical members 38 extending horizontally between the top and bottom members 26, 28.

The top, bottom, and vertical members 26, 28, 38 are typically coupled together using fasteners 44, such as nails and/or screws. However, the top, bottom, and/or the vertical members 38 may be couple together in any suitable manner, such as by an adhesive, with or without fasteners 44.

Typically, the top, bottom, and vertical members 26, 28, 38 are dimensional lumber. However, it is to be appreciated that the top, bottom, and vertical members 26, 28, 38 may be any suitable material, such as fiberglass, aluminum, light steel, or other metals. Additionally, the top, bottom, and vertical members 26, 28, 38 may be different materials relative to each other. For example, the top and bottom members 26, 28 may be dimensional lumber while the vertical members 38 may be metal.

The top, bottom, and vertical members 26, 28, 38 may be of any desired dimensions. For example, the top, bottom, and vertical members 26, 28, 38 may have a nominal cross-section of 2 inches by 4 inches or a nominal cross-section of 2 inches by 6 inches. It is to be appreciated that the top, bottom, and vertical members 26, 28, 38 may be of different dimensions relative to each other. For example, the top and bottom members 26, 28 may have the nominal cross-section of 2 inches by 6 inches and the vertical members 38 may have the nominal cross-section of 2 inches by 4 inches.

As best illustrated in FIG. 2, the vertical members 38 along with the top and bottom members 26, 28 define the height H of the wall assembly 20. Typically, the height H of the wall assembly 20 is of from about 2 to about 24 feet, more typically of from about 6 to about 12 feet, and even more typically of from about 8 to about 12 feet.

With reference to FIG. 1, the frame assembly 24 has a first end 46 and a second end 48 spaced from the first end 46. Typically, one of the vertical members 38 is disposed at the first end 46 of the frame assembly 24 and another one of the vertical members 38 is disposed at the second end 48 of the frame assembly 24 with other vertical members 38 spaced between the first and second ends 46, 48 of the frame assembly 24. The length L of the wall assembly 20 is defined between the first and second ends 46, 48 of the frame assembly 24. Additionally, a length of the top and bottom members 26, 28 is generally equal to the length L of the wall assembly 20. Typically, the length L of the wall assembly 20 is of from about 1 to about 52 feet, more typically of from about 5 to about 25 feet, and even more typically of from about 12 to about 16 feet, and even more typical still of from about 8 to about 12 feet.

The length L of the wall assembly 20 may vary depending on specific needs of a customer. For example, the length L of the wall assembly 20 may be equal to a length of the exterior wall of the building in which the wall assembly 20 is to be used. Alternatively, the length L of the wall assembly 20 may be shorter than the exterior wall of the building in which the wall assembly 20 is to be used such that multiple wall assemblies 20 are joined together to form a unitary wall of the building.

With reference to FIG. 2, the vertical members 38 are typically spaced apart from each other a distance DS. A plurality of voids are defined by the vertical members 38. Said differently, the plurality of voids are between the vertical members 38. Typically, the distance DS is measured from a centerline of one of the vertical members 38 to a centerline of another one of the vertical members 38. The vertical members 38 are typically equally spaced apart throughout the frame assembly 24. However, it is to be appreciated that the distance DS between adjacent vertical members 38 may vary throughout the frame assembly 24. For example, the distance DS between the vertical members 38 may vary for defining an opening in the frame assembly 24 to receive a window frame. It is to be appreciated that the distance DS between the vertical members 38 may vary for defining other openings in the frame assembly 24 to receive other desired structures, such as door frames. The distance DS between adjacent vertical members 38 is typically of from about 1 to about 32 inches, more typically of from about 10 to about 32 inches, even more typically of from about 12 to about 28 inches on-center. For example, the distance DS between adjacent vertical members 38 may be 12, 16, and/or 24 inches on-center.

With reference to FIG. 1, the wall assembly 20 further includes a rigid foam layer 50. The rigid foam layer 50 is directly coupled to the vertical exterior surface 40 of the plurality of vertical members 38. Said differently, the rigid foam layer 50 is directly against the vertical members 38. The rigid foam layer 50 is generally planar. Said differently, the rigid foam layer 50 is generally parallel to the frame assembly 24.

The rigid foam layer 50 has a foam interior surface 52 configured to face the interior of the structure and a foam exterior surface 54 configured to face the exterior of the structure. A rigid foam depth RFD is defined between the foam interior surface 52 and the foam exterior surface 54. The foam interior layer 52 is coupled to the vertical exterior surface 40 of the plurality of vertical members 38. The rigid foam layer 50 may be coupled to the vertical members 38 by any suitable manner. For example, the fasteners 44 may be used to couple the rigid foam layer 50 to the vertical members 38. Alternatively, the rigid foam layer 50 may be bonded directly to the vertical members 38.

The rigid foam layer 50 is typically selected from the group of polyurethane foams, polyurea foams, and combinations thereof. The rigid foam layer 50 may be one of polystyrene foams or polyisocyanurate foams. However, it is to be appreciated that the rigid foam layer 50 may be any suitable material. For example, the insulating layer 62 may be a pour in place foam. Additionally, the rigid foam layer 50 may be a sprayable foam selected from the group of polyurethane sprayable foams, polyurea sprayable foams, and combinations thereof. However, the sprayable foam may be selected from the group of acrylic foams, latex foams, melamine foams, isocyanurate foams, and silicone foams. When the sprayable foam is a polyurethane sprayable foam, the sprayable foam may be the reaction product of a polyether polyol and an isocyanate. It is to be appreciated that any polyether polyols may be used. Alternatively, when the sprayable foam is the polyurethane sprayable foam, the sprayable foam may be the reaction product of a polyester polyol and the isocyanate. The use of the polyester polyol imparts the rigid foam layer 50 with a fire retardant. When the sprayable foam is a polyurea sprayable foam, the sprayable foam is the reaction product of a polyamine and an isocyanate. An example of an isocyanate suitable for the sprayable foam is lubrinate.

Typically, the rigid foam layer 50 is made from a plurality of particles and a binder. The particles and the binder impart the rigid foam layer 50 with strength. More specifically, the rigid foam layer 50 has a flexural strength typically greater than 25 psi according to ASTM C 203. Additionally, the rigid foam layer 50 has a compressive resistance of 10% deformation at greater than 13 psi according to ASTM D 1621.

Typically, the particles are greater than 80 percent by volume, more typically greater than 85 percent by volume, and even more typically greater than 90 percent by volume of the rigid foam layer 50. The particles have a density typically of from about 1000 $kg/m_3$ or less, more typically of from about 500 $kg/m_3$ or less, and even more typically less than 300 $kg/m_3$.

Typically, the binder is a polymer. However, it is to be appreciated that the binder may be any suitable material for binding the particles together. The binder can possess adhesive properties, flame retardation properties, heat reflective properties, sound damping properties, or a combination of these. The binder can be prepared from aqueous dispersions that include water and a polymer. The dispersions can be anionic, cationic, or nonionic. Suitable polymers or copolymers for the binder include acrylic-based polymers and copolymers, styrene-acrylic-based copolymers, styrene-butadiene-based copolymers, vinyl acrylic-based copolymers, vinyl acetate based polymers and copolymers (e.g. ethylene vinyl acetate), natural rubber latex, neoprene, and polyurethanes. In some embodiments, the binder includes an acrylic-based polymer or copolymer, a styrene-acrylic-based copolymer, a styrene-butadiene-based copolymer, a vinyl acrylic-based copolymer, a vinyl acetate based polymer or copolymer (e.g. ethylene vinyl acetate), and combinations thereof.

The binder can be derived from one or more monomers. For example, the monomers can include vinyltoluenes (e.g., styrene); conjugated dienes (e.g., isoprene or butadiene); $\alpha,\beta$-monoethylenically unsaturated mono- and dicarboxylic acids or anhydrides thereof (e.g., acrylic acid, methacrylic acid, crotonic acid, dimethacrylic acid, ethylacrylic acid, allylacetic acid, vinylacetic acid, maleic acid, fumaric acid, itaconic acid, mesaconic acid, methylenemalonic acid, citraconic acid, maleic anhydride, itaconic anhydride, and methylmalonic anhydride); esters of $\alpha,\beta$-monoethylenically unsaturated mono- and dicarboxylic acids having 3 to 6 carbon atoms with alkanols having 1 to 12 carbon atoms (e.g., esters of acrylic acid, methacrylic acid, maleic acid, fumaric acid, or itaconic acid, with C1-C12, C1-C8, or C1-C4 alkanols such as ethyl, n-butyl, isobutyl and 2-ethylhexyl acrylates and methacrylates, dimethyl maleate and n-butyl maleate); acrylamides and alkyl-substituted acrylamides (e.g., (meth)acrylamide, N-tert-butylacrylamide, and N-methyl(meth)acrylamide); (meth)acrylonitrile; vinyl and vinylidene halides (e.g., vinyl chloride and vinylidene chloride); vinyl esters of C1-C18 mono- or dicarboxylic acids (e.g., vinyl acetate, vinyl propionate, vinyl n-butyrate, vinyl laurate and vinyl stearate); C1-C4 hydroxyalkyl esters of C3-C6 mono- or dicarboxylic acids, especially of acrylic acid, methacrylic acid or maleic acid, or their derivatives alkoxylated with from 2 to 50 moles of ethylene oxide, propylene oxide, butylene oxide and combinations thereof, or esters of these acids with C1-C18 alcohols alkoxylated with from 2 to 50 mol of ethylene oxide, propylene oxide, butylene oxide and combinations thereof (e.g., hydroxyethyl (meth)acrylate, hydroxypropyl (meth)acrylate, and methylpolyglycol acrylate); and monomers containing glycidyl groups (e.g., glycidyl methacrylate).

Additional monomers or co-monomers that can be used include linear 1-olefins, branched-chain 1-olefins or cyclic olefins (e.g., ethene, propene, butene, isobutene, pentene, cyclopentene, hexene, and cyclohexene); vinyl and allyl alkyl ethers having 1 to 40 carbon atoms in the alkyl radical, wherein the alkyl radical can possibly carry further substituents such as a hydroxyl group, an amino or dialkylamino group, or one or more alkoxylated groups (e.g., methyl vinyl ether, ethyl vinyl ether, propyl vinyl ether, isobutyl vinyl ether, 2-ethylhexyl vinyl ether, vinyl cyclohexyl ether, vinyl 4-hydroxybutyl ether, decyl vinyl ether, dodecyl vinyl ether, octadecyl vinyl ether, 2-(diethylamino)ethyl vinyl ether, 2-(di-n-butylamino)ethyl vinyl ether, methyldiglycol vinyl ether, and the corresponding allyl ethers); sulfo-functional monomers (e.g., allylsulfonic acid, methallylsulfonic acid, styrenesulfonate, vinylsulfonic acid, allyloxybenzenesulfonic acid, 2-acrylamido-2-methylpropanesulfonic acid, and their corresponding alkali metal or ammonium salts, sulfopropyl acrylate and sulfopropyl methacrylate); vinylphosphonic acid, dimethyl vinylphosphonate, and other phosphorus monomers; alkylaminoalkyl (meth)acrylates or alkylaminoalkyl(meth)acrylamides or quaternization products thereof (e.g., 2-(N,N-dimethylamino)ethyl (meth)acrylate, 3-(N,N-di methylamino)propyl (meth)acrylate, 2-(N,N, N-trimethylammonium)ethyl (meth)acrylate chloride, 2-dimethylaminoethyl(meth)acrylamide, 3-dimethylaminopropyl(meth)acrylamide, and 3-trimethylammoniumpropyl (meth)acrylamide chloride); allyl esters of C1-C30 monocarboxylic acids; N-vinyl compounds (e.g., N-vinylformamide, N-vinyl-N-methylformamide, N-vinylpyrrolidone, N-vinylimidazole, 1-vinyl-2-methylimidazole, 1-vinyl-2-methylimidazoline, N-vinylcaprolactam, vinylcarbazole, 2-vinylpyridine, and 4-vinylpyridine).

The monomers used may include cross-linking monomers, such as divinylbenzene; 1,4-butanediol diacrylate; methacrylic acid anhydride; monomers containing 1,3-diketo groups (e.g., acetoacetoxyethyl(meth)acrylate or diacetonacrylamide); monomers containing urea groups (e.g., ureidoethyl (meth)acrylate, acrylamidoglycolic acid, and methacrylamidoglycolate methyl ether); and silane cross-linkers (e.g., 3-methacryloxypropyl trimethoxysilane and 3-mercaptopropyl trimethoxysilane). Additional examples of cross-linkers include N-alkylolamides of α,β-monoethylenically unsaturated carboxylic acids having 3 to 10 carbon atoms and esters thereof with alcohols having 1 to 4 carbon atoms (e.g., N-methylolacrylamide and N-methyl- olmethacrylamide); glyoxal based cross-linkers; monomers containing two vinyl radicals; monomers containing two vinylidene radicals; and monomers containing two alkenyl radicals. Exemplary cross-linking monomers include diesters or triesters of dihydric and trihydric alcohols with α,β-monoethylenically unsaturated monocarboxylic acids (e.g., di(meth)acrylates, tri(meth)acrylates), of which in turn acrylic acid and methacrylic acid can be employed. Examples of such monomers containing two non-conjugated ethylenically unsaturated double bonds are alkylene glycol diacrylates and dimethacrylates, such as ethylene glycol diacrylate, 1,3-butylene glycol diacrylate, 1,4-butylene glycol diacrylate and propylene glycol diacrylate, vinyl methacrylate, vinyl acrylate, allyl methacrylate, allyl acrylate, diallyl maleate, diallyl fumarate and methylenebisacrylamide.

Functional groups present in the cross-linking monomers included in the binder described herein can be cross-linked by a chemical reagent. The chemical reagent is capable of cross-linking the functional groups of the cross-linking monomers to form, for example, covalent bonds, ionic bonds, hydrogen bonds, metallic bonds, dipole-dipole interactions, and cation-pi interactions.

Chemical reagents useful in the aqueous latex dispersions described herein include, for example, divalent and multi-valent cations, such as zirconium (e.g., ammonium zirconium carbonate), zinc (e.g., zinc oxide and/or zinc peroxide), calcium, magnesium, aluminum, iron, tin, titanium, antimony, vanadium, and combinations thereof. Other suitable chemical reagents include carbodiimides (e.g., polycarbodiimides), polyisocyanates, organosilanes (e.g., epoxysilanes), urea-formaldehyde resins, melamine-formaldehyde resins, epoxy containing compounds, aziridines, acrylamides (e.g., N-methyloylacrylamide), hydrazides (e.g., adipic acid dihydrazide), glyoxal condensates, oxazolines, polyethylenimines, polyamines, dialdehydes, and combinations thereof.

The copolymer included in the binder can be prepared by heterophase polymerization techniques, including, for example, free-radical emulsion polymerization, suspension polymerization, and mini-emulsion polymerization. In some examples, the binder is prepared by polymerizing the monomers using free-radical emulsion polymerization. The emulsion polymerization temperature is generally from 10° C. to 95° C. or from 75° C. to 90° C. The polymerization medium can include water alone or a mixture of water and water-miscible liquids, such as methanol. In some embodiments, water is used alone. The emulsion polymerization can be carried out either as a batch, semi-batch, or continuous process. Typically, a semi-batch process is used. In some embodiments, a portion of the monomers can be heated to the polymerization temperature and partially polymerized, and the remainder of the polymerization batch can be subsequently fed to the polymerization zone continuously, in steps or with superposition of a concentration gradient.

The free-radical emulsion polymerization can be carried out in the presence of a free-radical polymerization initiator. The free-radical polymerization initiators that can be used in the process are all those which are capable of initiating a free-radical aqueous emulsion polymerization including alkali metal peroxydisulfates and $H_2O_2$, or azo compounds. Combined systems can also be used including at least one organic reducing agent and at least one peroxide and/or hydroperoxide, e.g., tert-butyl hydroperoxide and the sodium metal salt of hydroxymethanesulfinic acid or hydrogen peroxide and ascorbic acid. Combined systems can also be used additionally containing a small amount of a metal compound which is soluble in the polymerization medium and whose metallic component can exist in more than one oxidation state, e.g., ascorbic acid/iron(II) sulfate/hydrogen peroxide, where ascorbic acid can be replaced by the sodium metal salt of hydroxymethanesulfinic acid, sodium sulfite, sodium hydrogen sulfite or sodium metal bisulfite and hydrogen peroxide can be replaced by tert-butyl hydroperoxide or alkali metal peroxydisulfates and/or ammonium peroxydisulfates. In the combined systems, the carbohydrate derived compound can also be used as the reducing component. In general, the amount of free-radical initiator systems employed can be from 0.1 to 2%, based on the total amount of the monomers to be polymerized. In some embodiments, the initiators are ammonium and/or alkali metal peroxydisulfates (e.g., sodium persulfate), alone or as a constituent of combined systems. The manner in which the free-radical initiator system is added to the polymerization reactor during the free-radical aqueous emulsion polymerization is not critical. It can either all be introduced into the polymerization reactor at the beginning, or added continuously or stepwise as it is consumed during the free-radical aqueous emulsion polymerization. In detail, this depends in a manner known to an average person skilled in the art both from the chemical nature of the initiator system and on the polymerization temperature. In some embodiments, some is introduced at the beginning and the remainder is added to the polymerization zone as it is consumed. It is also possible to carry out the free-radical aqueous emulsion polymerization under superatmospheric or reduced pressure.

In addition, small amounts (e.g., from 0.01 to 2% by weight based on the total monomer weight) of molecular weight regulators, such as tert-dodecyl mercaptan, can optionally be used. Such substances are added to the polymerization zone in a mixture with the monomers to be polymerized and are considered part of the total amount of unsaturated monomers used in the copolymer.

In some examples, the polymer for use in the binder has a glass transition temperature ($T_g$), as measured by differential scanning calorimetry, less than or equal to the temperature of the room in which the binder is used (e.g., in an attic, the $T_g$ is 65° C. or less). For example, the $T_g$ of the binder copolymer can be 50° C. or less, 40° C. or less, 30° C. or less, 20° C. or less, or 10° C. or less.

The polymers for use in the binder can include self-cross-linking polymers or cross-linkable polymers. Specific examples of useful polymers for inclusion in the binder described herein include, but are not limited to, ACRONAL NX 4787, acrylic polymers commercially available from BASF Corporation (Florham Park, N.J.). The polymers for use in the binder can also include flame retardant polymers.

The binder described herein can include adhesives or sealants. Examples of suitable adhesives include thermosetting adhesives, thermoplastic adhesives, elastomeric adhesives, and hybrid adhesives. The adhesives can be structural adhesives such as epoxies, epoxy hybrids, formaldehyde based adhesives (e.g., resorcinol formaldehyde, phenol resorcinol formaldehyde, melamine formaldehyde, and urea formaldehyde), phenolics and modified phenolics (nitrile-phenolics, vinyl-phenolics, and neoprene-phenolics), polyaromatic high temperature resins (e.g., polyimides, bismaleimides, and polybenzimidazoles), polyesters, polyurethanes, anaerobic resins, cyanoacrylates, and modified acrylics. Additionally, the adhesives can be non-structural adhesives such as elastomeric resins (e.g., natural rubber, asphalt, reclaimed rubber, butyl rubber, styrene butadiene rubber, polychloroprene, acrylonitrile butadiene, polyisobutylene, polyvinyl methyl ether, polysulfide, and silicone). The adhesives can also be thermoplastic resins, such as polyvinyl acetal, polyvinyl acetate, polyvinyl alcohol, thermoplastic elastomers, ethylene vinyl acetate, cellulosic resins, polyamide, polyester, polyolefins, polysulfone, phenoxy, and acrylic resins. Further, the adhesives can be naturally occurring resins such as natural organic resins (e.g., glues of agricultural or animal origin) or inorganic adhesives and cements (e.g., sodium silicate, phosphate cements, litharge cement, and sulfur cement).

Examples of suitable sealants include hardening and non-hardening sealants, two-part system sealants, single component sealants, and solvent and water release sealants. These sealants can be low performance sealants (e.g., oil- and resin-based sealants, asphaltic and other bituminous mastics, polyvinyl acetate, epoxy, and polyvinyl chloride plastisol), medium performance sealants (e.g., hydrocarbon rubber-based sealants, acrylic, chlorosulfonated polyethylene, and hot-melt sealants), or high performance sealants (e.g., fluorosilicone and fluoropolymer sealants, polysulfides, polyethers, polyurethanes, silicones, styrene butadiene copolymers, and chloroprenes). These and other suitable adhesives and sealants are described in detail in E. M. Petrie, "Handbook of Adhesives and Sealants, Chapter 8: Adhesive Classification, Chapter 10: Adhesive Families, Chapter 12: Sealant Classification and Composition, and Chapter 13: Sealant Families," McGraw-Hill, New York, 2000.

The binder described herein can have a solids percentage of 40% to 85%. For example, the binder can have a solids percentage from 50% to 80%, from 55% to 75%, or from 60% to 70%.

In some examples, the binder is substantially free of curing agents or cross-linking agents. "Substantially free" means that the binder can include less than 0.1%, less than 0.01%, less than 0.001%, less than 0.0001%, or 0% of curing agents or cross-linking agents based on the weight of the binder. In other examples, the binder contains reactive groups that can bond with one or more reactive groups present in the plurality of particles.

The particles, as described herein, can be pre-expanded polymers that can be fully expanded or partially expanded, for example, with air. For example, the pre-expanded polymer can comprise of from 50 to 99 percent air by volume. The pre-expanded polymer can be previously expanded with an organic blowing agent, such as a hydrocarbon like pentane, isopentane, butane and combinations thereof. Alternatively, the pre-expanded polymer can be previously expanded with an inorganic blowing agent, such an air, carbon dioxide, nitrogen, argon, and combinations thereof. It is to be appreciated that the pre-expanded polymer can be partially expanded, such that the pre-expanded polymer is capable of further expansion, or can be fully expanded. Typically, the pre-expanded polymer is greater than of about 50, more typically greater than 60, and even more typically greater than 70 percent expanded.

The particles can be polymeric particles, non-polymeric particles, and combinations thereof. For example, the particles can be inorganic microspheres and lightweight inorganic particles, such as inorganic particles with a density of from about 10 to 20 kg/m$^3$.

The pre-expanded polymer can be derived from expanded polymers, including thermoplastic polymers. Examples of pre-expanded polymers include polystyrene (e.g. free-radical-polymerized glass-clear polystyrene (GPPS) or anionically polymerized polystyrene (APS)), styrene-based-copolymers (e.g., styrene-maleic anhydride copolymers, styrene-butadiene copolymers, styrene-α-methylstyrene copolymers, acrylonitrile-butadiene-styrene (ABS) copolymers, styrene-acrylonitrile (SAN) copolymers, styrene-methyl methacrylate copolymers, acrylonitrile-styrene-acrylate (ASA) copolymers, methacrylate-butadiene-styrene (MBS) copolymers, or methyl methacrylate-acrylonitrile-butadiene-styrene (MABS) copolymers), polyethylene (e.g., low density polyethylene, high density polyethylene, and linear low-density polyethylene), polypropylene, polyesters, polyacrylic esters, polymethacrylic esters, thermoplastic polyurethane and polyamides, and combinations thereof. Further examples of suitable pre-expanded polymers include polyphenylene oxide, polystyrene-polyphenylene oxide blends, polyoxymethylene, poly(methyl methacrylate), methyl methacrylate copolymers, ethylene-propylene copolymers (e.g., random and block), ethylene-vinyl acetate copolymers, polycarbonate, polyethylene terephthalate, aromatic polyester/polyether glycol block copolymer, polyethylene and polymerized vinyl aromatic resins. Examples of vinyl aromatic resins include the solid homopolymers of styrene, vinyltoluene, vinylxylene, ethylvinylbenzene, isopropylstyrene, t-butylstyrene, chlorostyrene, dichlorostyrene, fluorostyrene, bromostyrene; the solid copolymers of two or more monovinyl aromatic compounds; and the solid copolymers of one or more of monovinyl aromatic compounds and a copolymerizable olefinic compound (e.g., acrylonitrile, methyl methacrylate, or ethyl acrylate). In some examples, the pre-expanded polymer includes a mixture of polystyrene and polyvinyl chloride. Examples of suitable commercially available pre-expanded polymers include NEOPOR and STYROPOR, expandable polystyrenes commercially available from BASF Corporation (Florham Park, N.J.).

In some examples, the plurality of particles includes inorganic particles. The inorganic particles can be hollow, solid, macroporous, inert, and/or non-toxic. Examples of inorganic particles include, but are not limited to, expanded perlite, hollow glass particles, for example those sold under the trademark NOBLITE® (Noble International; France) or amorphous sililca, for example sold under the trademark such as Nanogel from Aspen Cabot®.

Each of the plurality of particles is not limited in shape. For example, each of the plurality of particles can be beads, flakes, fibers, rods, disks, cubes, cylinders, pyramids, cones, cuboids, spheres, granules, platelets, microballoons, and combinations thereof. In some examples, the plurality of particles are uniform in shape (e.g., beads only). In other examples, the plurality of particles includes a mixture of two or more shapes (e.g., beads, spheres, and flakes). In some embodiments, the plurality of particles are small in size and of low density and overall weight. For example, the average particle size of the largest dimension of the plurality of particles is from 0.1 to 10 mm. However, it is to be appreciated that the plurality of particles may include multiple particle sizes. For example, the plurality of particles can include small (i.e., the largest dimension of the pre-expanded polymer is less than 1.0 mm), medium (i.e., the largest dimension of the pre-expanded polymer is from 1.0 to 2.0 mm), and large (i.e., the largest dimension of the pre-expanded polymer is greater than 2.0 mm, such as, for example, from 2.0 mm to 10 mm) particle sizes to provide a closely packed yet breathable barrier, which still defines the pathways 50.

The plurality of particles can be flame retardant. Additionally, flame retardant materials can be added to the binder. Generally, the flame retardant properties of the particles and the binder provide the rigid foam layer 50 with a flame resistance that meets ASTM E-84. An example of suitable flame retardant materials for the binder include non-halogenated flame retardant to provide the desired level of flame resistance required. Flame retardant particles can include pre-expanded polymers STYROPOR BF and NEOPOR, expandable polystyrenes commercially available from BASF Corporation (Florham Park, N.J.), and inorganic particles.

Additionally, phosphorus flame retardants can be added to the binder and be either inorganic or organic based. This includes organic phosphate esters, phosphates and inorganic phosphorous containing salts. Phosphate moiety can also be incorporated into the binder. Furthermore, metal hydroxides can be added to the binder formulation to enhance flame resistance, including aluminum trihydrate and magnesium hydroxide. Borates can be used alone or in combination with aluminum trihydrate and magnesium hydroxide. Suitable borates include sodium borate, boric acid and zinc borate. Polydimethylsiloxane alone or in combination with the above mention retardants can also be used. Conventional fillers can be supplemented with silica and talc to further enhance the flame resistance of the insulation drainage board.

The plurality of particles can include insulating materials (e.g. fiberglass, rockwool, expanded polystyrene, polyiscyanurate and polyurethane). The plurality of particles can further include recycled material. The recycled materials can be insulating materials. For example, the plurality of particles can include recycled materials such as polymeric organic materials (e.g. polystyrene, polyurethane and polyisocyanurate), inorganic materials (e.g. carbonates, clay, mica, stone, glass, and metal oxides), and combinations thereof. Organic polymers include, for example, filled and unfilled thermoset/thermoplastic polymers. Examples of filled polymers materials are reinforced reaction injection molded (RRIM) thermoset plastic materials that have an organic component comprising substantially polyurethanes; unreacted precursors of the RRIM polymer such as polyols and isocyanates; sheet molding compounds (SMC) which have an organic component comprising styrene cross-linked polyesters; uncured SMC reactants comprising styrene and unsaturated polyesters; and epoxies, phenolics, silicates, melamines, diallylphthalates, and polyimides as are typically used in reinforced plastics. Examples of useful unfilled polymer materials are reaction injection molded (RIM) plastics, such as unreinforced RIM polyurethanes and polyureas, polyethylenes, polyethylene terephthalate, polystyrenes, and scrap rubber tires that comprise filled or unfilled polymer materials. The recycled polymer materials, inorganic recycled materials, and composite recycled products typically are ground, shredded, or otherwise comminuted before inclusion in the plurality of particles and can include lightweight or foamed polymer materials such as, but not limited to, ground expanded polystyrene, polyurethane, and other lightweight materials. The plurality of particles can be greater than 80% by volume of the composition. For example, the plurality of particles can be greater than 60%, greater than 70%, greater than 80%, greater than 90%, or greater than 95% by volume of the composition.

The rigid foam layer 50 may include a filler, such as heat reflective material, fire retardants, and impact modifiers. Fillers suitable for use in the compositions described herein include ground/recycled glass (e.g., window or bottle glass), milled glass, glass spheres, glass flakes, glass fibers, clays (e.g., kaolin), feldspar, mica, talc, activated carbon, metals and alloys (e.g., nickel, copper, aluminum, silicon, solder, silver, and gold), metal-plated particulates (e.g., silver-plated copper, silver-plated nickel, and silver-plated glass microspheres), sol-gel ceramics (e.g., sol-gel $SiO_2$, $TiO_2$ or Al$_2$O$_3$), precipitated ceramics (such as SiO$_2$, TiO$_2$ or Al$_2$O$_3$), ceramic microspheres, fused silica, fumed silica, amorphous fused silica, aluminum trihydrate (ATH), sand, ground sand, slate dust, crusher fines, red mud, amorphous carbon (e.g., carbon black), wollastonite, alumina, bentonite, quartz, garnet, saponite, beidellite, granite, calcium carbonate, calcium oxide, calcium hydroxide, antimony trioxide, barium sulfate, magnesium oxide, titanium dioxide, zinc carbonate, zinc oxide, nepheline syenite, perlite, diatomite, pyrophillite, soda ash, trona, and organic or inorganic fibers. For example, the filler can include calcium carbonate and/or aluminum trihydrate. In some examples, the filler can include heat and/or infrared reflective materials, such as those present in RADIANCE e-0.25 AB-C, an acrylic copolymer emulsion/pigment blend commercially available from BASF Corporation (Florham Park, N.J.), and other pigments or metallic flake materials (e.g., aluminum flake materials). In some examples, the composition can include a liquid flame retardant, for example, in an amount of 0 to 30% by weight of the composition. The composition can also include additives such as antioxidants, thickeners, fungicides, biocides, surfactants, defoamers, coalescing agents, tackifiers, plasticizers, dispersants, rheology modifiers, dyes, freeze-thaw agents, wetting agents, other formulating agents, and combinations thereof. Examples of suitable heat reflective material include, but are not limited to, graphite, and pigments. Generally, the particles and the binder are mixed to form the rigid foam layer 50. The binder coats the particles and is cured to form the rigid foam layer 50. The rigid foam layer 50, once the binder is cured, can provide insulating properties.

The preformed panels may be coupled directly to the frame assembly 24 by the fasteners 44. Alternatively, the preformed panels may be adhesively bonded to the frame assembly 24.

Examples of suitable preformed panels for use as the rigid foam layer 50 include products sold under the trade name NEOPOR. Examples of suitable spray foams for use as the rigid foam layer 50 include products sold under the trade name WALLTITE HP.

The rigid foam layer 50 has a thickness and provides the wall assembly 20 with a thermal resistance, or R-value. Typically, the rigid foam layer 50 has a thickness of from about 0.25 to about 3.50 inches, more typically of from about 0.25 to about 2.00 inches, and even more typically or from about 0.50 to about 1.50 inches. Additionally, the rigid foam layer 50 has a density of from about 1.00 to about 5.00 pounds per cubic foot, more typically of from about 1.00 to about 4.50 pounds per cubic foot, and even more typically of from about 1.00 to about 2.00 pounds per cubic foot. Furthermore, the rigid foam layer 50 typically has an R-value of from about 1.00 to about 9.00 per inch, and more typically, 3.00 to about 7.00 per inch.

Figure 3:
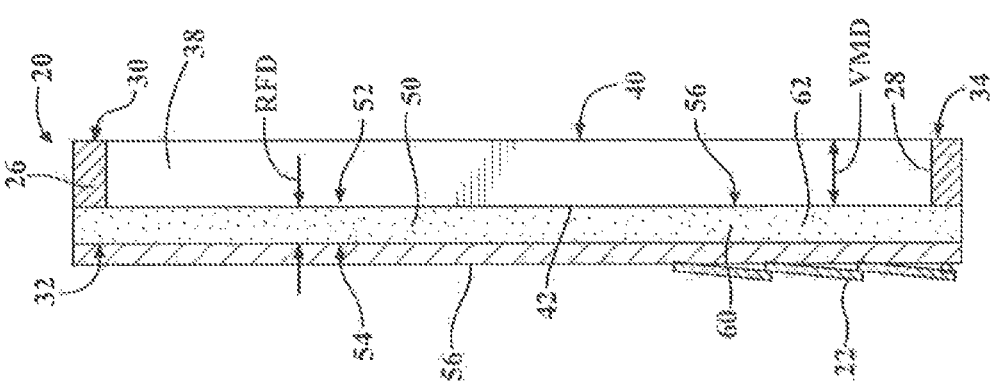
FIG. 3 is a cross-sectional view of the wall assembly taken along line 3-3 of FIG. 1.
Figure 4:
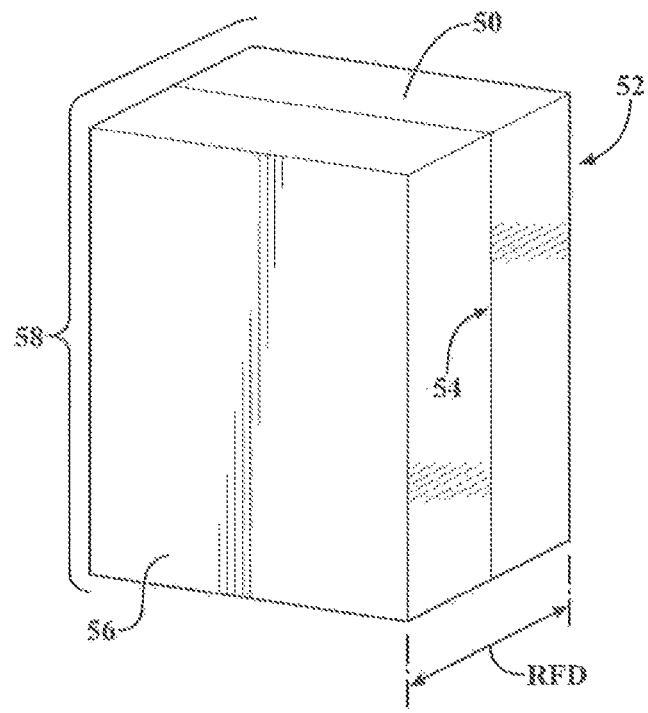
FIG. 4 is an enlarged perspective view of the rigid foam layer and the sheathing layer bonded together to form a laminated composite layer.
Figure 5:
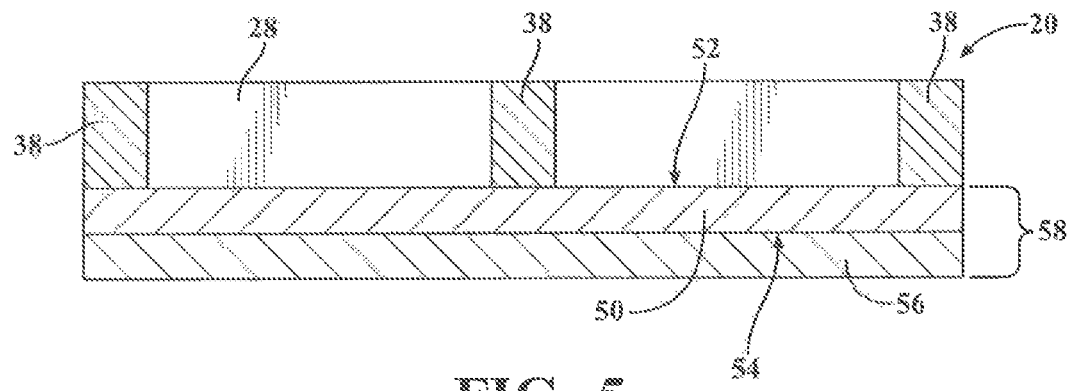
FIG. 5 is a cross-sectional view of the wall assembly taken along line 6-6 of FIG. 1.

With reference to FIGS. 1 and 3, the wall assembly 20 includes a sheathing layer 56 coupled to the rigid foam layer 50 opposite the plurality of vertical members 38. More specifically, the sheathing layer 56 is coupled to the foam exterior layer 54 of the rigid foam layer 50. The sheathing layer 56 may be bonded directly to the rigid foam layer 50 such that the rigid foam layer 50 and the sheathing layer 56 forms a laminated composite layer 58. Said differently, the wall assembly 20 may include the laminated composite layer 58, which is the sheathing layer 56 bonded to the rigid foam layer 50.

It is to be appreciated that the sheathing layer 56 may be bonded to the rigid foam layer 50 before the rigid foam layer 50 is coupled to the vertical members 38. Alternatively, the sheathing layer 56 may be bonded to the rigid foam layer 50 to form the laminated composite layer 58 before the rigid foam layer 50 is coupled to the vertical members 38. It is to be appreciated that the sheathing layer 56 may be bonded to the rigid foam layer 50 in any suitable manner. For example, an adhesive may be applied to the sheathing layer 56 and/or the rigid foam layer 50 and then the sheathing layer 56 and the rigid foam layer 50 are pressed together until the adhesive cures thereby forming the laminated composite layer 58. It is to the appreciated that the pressing of the sheathing layer 56 and the rigid foam layer 50 together may be accomplished in any suitable manner. For example, the pressing may be completed by a vacuum press or mechanical press. Alternatively, the sheathing layer 56 and the rigid foam layer 50 may simply be adhered together without the step of pressing. It is also to be appreciated that the laminated composite layer 58 may not require an actual press to bond the sheathing layer 56 to the rigid foam layer 50.

The rigid foam layer 50 may be a preformed panel with the sheathing layer 56 subsequently bonded to the rigid foam layer 50 to form the laminated composite layer 58. Alternatively, the rigid foam layer 50 may be applied and cured on the sheathing layer 56 and once the rigid foam layer 50 is cured, the laminated composite layer 58 is formed. Bonding the sheathing layer 56 to the rigid foam layer 50 increases the strength of the wall assembly 20 compared to wall assemblies without the sheathing layer 56. More specifically, the wall assembly 20 with the laminated composite layer 58 complies with the 2006, 2009, and 2012 International Residential Code (IRC), and complies with 2006, 2009, and 2012 International Building Code (IBC), and also complies with 2006, 2009, and 2012 International Energy Conservation Code (IECC).

Typically, when the particles and the binder are cured on the sheathing layer 56, the particles and the binder are mixed to form a fluid composition prior to coupling the rigid foam layer 50 to the frame assembly 24. For example, the fluid composition may be rolled or brushed onto the frame assembly 24. More typically, when the particles and the binder are cured on the sheathing layer 56, the particles and the binder are mixed to form a sprayable composition. For example, the sprayable composition may be sprayed onto an exterior side 58 of the sheathing layer 56. It is to be appreciated that the particles and the binder may be mixed to form the sprayable composition prior to applying the sprayable composition to the sheathing layer 56. For example, the sprayable composition may be formed and subsequently sprayed onto the exterior side 58 of the sheathing layer 56 to apply the sprayable composition on the sheathing layer 56. Typically, when the fluid composition or the sprayable composition are used, the rigid foam layer 50 is seamless across the length L of the frame assembly 24.

Additionally, when the fluid composition or the sprayable composition are used, the rigid foam layer 50 has a density of from about 0.5 to about 5.00 pounds per cubic foot. Furthermore, when the fluid composition or the sprayable composition are used, the rigid foam layer 50 typically has an R-value of from about 1.00 to about 9.00 per inch and more typically of from about 3.00 to about 7.00 per inch.

As described above, the rigid foam layer 50 is between the sheathing layer 56 and the frame assembly 24. Because the rigid foam layer 50 is disposed between the sheathing layer 56 and the frame assembly 24, the rigid foam layer 50 acts as a thermal break between the sheathing layer 56 and the frame assembly 24 within the wall assembly 20. Said differently, the rigid foam layer 50 reduces the thermal conductance of the wall assembly 20 from the sheathing layer 56 to the frame assembly 24.

The sheathing layer 56 can be any suitable material. For example, the sheathing layer 56 may be selected from the group of rigid insulation (polystyrene, polyurethane, polyiso) oriented strand board (OSB), plywood, fiber board, cementitious board, mineral based boards, such as gypsum and magnesium oxide boards, and combinations thereof. It is to be appreciated that the fiber board may be natural or artificial fibers. It is also to be appreciated that the sheathing layer 56 may be a rigid insulation layer laminated to a structural sheathing, such as OSB, plywood, or a composite material.

The exterior covering 22 may be coupled to the sheathing layer 56 opposite the frame assembly 24. Said differently, the sheathing layer 56 is configured to receive the exterior covering 22. It is to be appreciated that the exterior coving may be applied on-site or off-site. Examples of suitable exterior coverings 22 include siding, brick, and/or an insulating foam panels. The exterior covering 22 may be secured to the wall assembly 20 by exterior fasteners 44, such as nails, screws, or ties. For example, when the exterior covering 22 is brick, the wall assembly 20 may include brick ties as the exterior fasteners 44. Alternatively, the exterior covering 22 may be secured to the wall assembly 20 by an adhesive. For example, when the exterior covering 22 is siding, panels of the siding may be adhesively bonded to the wall assembly 20.

Figure 6:
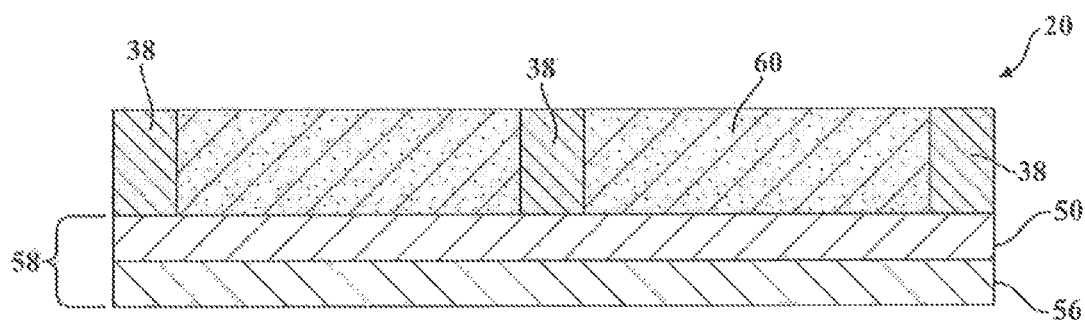
FIG. 6 is a cross-sectional view of the wall assembly showing an inner foam layer coupled to the rigid foam layer.
Figure 7:
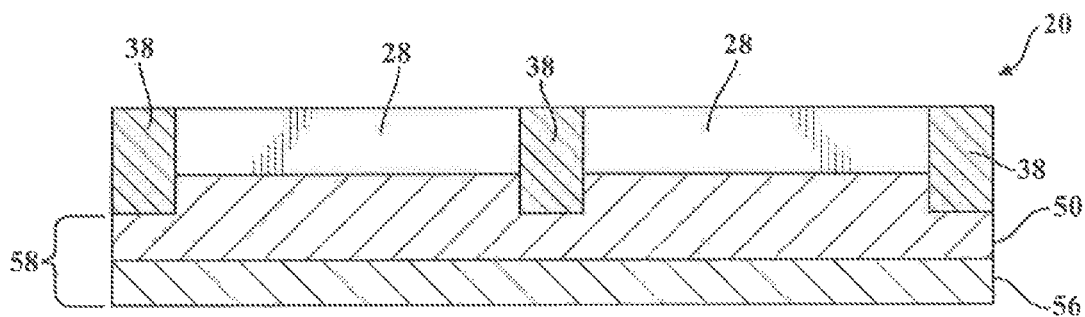
FIG. 7 is a cross-sectional view of the wall assembly showing the rigid foam layer extending into voids defined between the vertical members.
Figure 8:
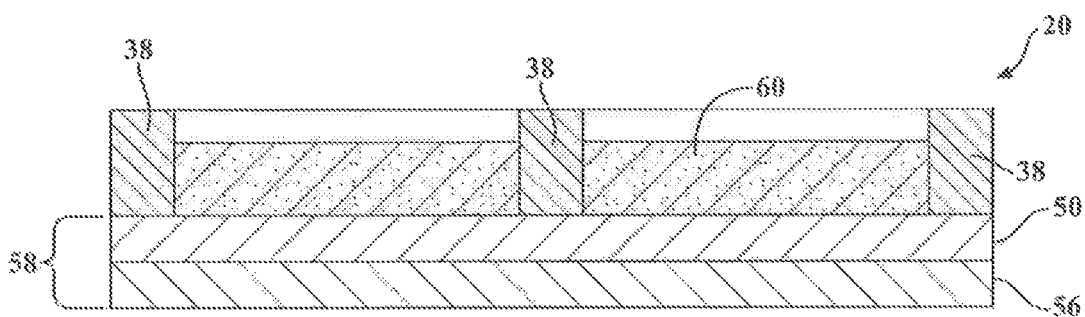
FIG. 8 is a cross-sectional view of the wall assembly showing the inner foam layer extending into the voids defined between the vertical members.

With reference to FIGS. 6 and 8, the wall assembly 20 may include an inner foam layer 60 applied to the rigid foam layer 50 and extending into the frame assembly 24. More specifically, when present, the inner foam layer 60 is applied to the rigid interior surface 54 of the rigid foam layer 50. The inner foam layer 60 may be bonded to the rigid foam layer 50 opposite the sheathing layer 56. Additionally, the inner foam layer 60 may at least partially fill the voids defined between the vertical members 38. Said differently, the inner foam layer 60 is disposed between the vertical members 38. It is to be appreciated that the inner foam layer 60 may completely fill the voids between the vertical members 38, as shown in FIG. 6. Alternatively, the inner foam layer 60 may only partially fill the voids between the vertical members 38, as shown in FIG. 8. It is to be appreciated that the inner foam layer 60 may be in contact with the vertical members 38 or, alternatively, the inner foam layer 60 may be spaced from the vertical members 38 while still being disposed between the vertical members 38. The inner foam layer 60 can be used to increase the R-value of the wall. Alternatively, the rigid foam layer 50 may extend in between the vertical members 38 of the frame assembly 24 thereby making the inner foam layer 60 unnecessary, as shown in FIG. 7.

The inner foam layer 60 is typically selected from the group of polyurethane foams, polyurea foams, and combinations thereof. However, it is to be appreciated that the inner foam layer 60 may be any suitable material. For example, the inner foam layer 60 may be a sprayable foam selected from the group of polyurethane sprayable foams, polyurea sprayable foams, and combinations thereof. However, the sprayable foam may be selected from the group of acrylic foams, latex foams, melamine foams, isocyanurate foams, and silicone foams. When the sprayable foam is a polyurethane sprayable foam, the sprayable foam may be the reaction product of a polyether polyol and an isocyanate. It is to be appreciated that any polyether polyols may be used. Alternatively, when the sprayable foam is the polyurethane sprayable foam, the sprayable foam may be the reaction product of a polyester polyol and the isocyanate. The use of the polyester polyol imparts the rigid foam layer 50 with a fire retardant. When the sprayable foam is a polyurea sprayable foam, the sprayable foam is the reaction product of a polyamine and an isocyanate. An example of an isocyanate suitable for the sprayable foam is lubrinate.

Generally, the rigid foam layer 50, and if present, the inner foam layer 60, provides structural support to the frame assembly 24. Said differently, the rigid foam layer 50 and/or the inner foam layer 60 may couple the top, bottom, and vertical members 26, 28, 38 together thereby reducing the number of fasteners 44 needed to structurally secure the top, bottom, and vertical members 26, 28, 38 together. Furthermore, the inner foam layer 60 may reduce the amount of fasteners 44 or even eliminate the fasteners 44 needed to couple together the top, bottom, and vertical members 26, 28, 38 such that the frame assembly 24 is free of fasteners 44 while still meeting structural requirements.

For example, the wall assembly 20 may be free of the fasteners 44 coupling the laminated composite layer 58 to the frame assembly 24. For example, the inner foam layer 60 and/or an adhesive may bond the rigid foam layer 50 of the laminated composite layer 58 to the vertical members 38 of the frame assembly 24. Additionally, the wall assembly 20 may be free of the fasteners 44 coupling the vertical members 38 between the top and bottom members 26, 28. For example, the inner foam layer 60 and/or an adhesive may be used to couple the vertical members 38 to the top and bottom members 26, 28.

As introduced above, the rigid foam layer 50 may be applied to the frame assembly 24 off-site from the location where the building is to be constructed. For example, the wall assembly 20 may be manufactured at a location that is different from the location that the building is to be constructed, such as the factory or warehouse. Manufacturing the wall assembly 20 off-site decreases labor cost for constructing the building and decreases construction time required to construct the building once the wall assembly 20 is on-site.

The wall assembly 20 may include a barrier layer coupled to the sheathing layer 56 opposite the rigid foam layer 50. The barrier layer may be an additional weather resistant barrier, and/or a radiant barrier. The barrier layer may be any suitable weather resistant barrier or radiant barrier, including fluid applied weather resistant barriers. Examples of fluid weather resistant barriers include sprayable weather resistant barriers and radiant barriers and roller or brush applied weather resistant barriers and radiant barriers.

It is to be appreciated that the rigid foam layer 50 and/or the inner foam layer 60 may include a chase portion for receiving utilities, such as electrical wires and/or plumbing. It is to be appreciated that the chase portion may run vertically within the rigid foam layer 50 and/or the inner foam layer 60 such that the chase portion are parallel to the vertical members 38 or the chase portion may run horizontally within the rigid foam layer 50 and/or the inner foam layer 60 such that the chase portion are perpendicular to the vertical members 38.

A method of manufacturing the wall assembly 20 is described below. The method includes the step of providing the frame assembly 24. The method also includes the step of coupling the rigid foam layer 50 to the frame assembly 24. The method further includes the step of coupling the sheathing layer 56 to the rigid foam layer 50 opposite the frame assembly 24. It is to be appreciated that the sheathing layer 56 to the rigid foam layer 50 may be further defined as laminating the sheathing layer 56 to the rigid foam layer 50 to produce the laminated composite layer 58. The step of coupling the rigid foam layer 50 may be further defined as coupling the laminated composite layer 58 to the frame assembly 24.

The method may also include the step of applying the inner foam layer 60 bonded to the rigid foam layer 50 opposite the sheathing layer 56 with the inner foam layer 60 extending into the frame assembly 24. As such, the method may include the step of applying the inner foam layer 60 within the voids defined between the vertical members 38 of the frame assembly 24.

It is to be appreciated that the step of applying the rigid foam layer 50 may be further defined as spraying foam onto the sheathing layer to form the rigid foam layer 50. In such an embodiment, the method would include the step of curing the rigid foam layer 50 thereby forming the wall assembly 20. It is to be appreciated that the step of curing the binder may be passive, i.e., there is no need for an affirmative step, such as heating, etc. to cure the binder. Said differently, the binder may cure naturally via a respective curing mechanism of the binder composition. Alternatively, an affirmative step, such as applying heat to the binder, may be required to cure the binder.

The step of providing the frame assembly 24 may be further defined as assembling the frame assembly 24 with the plurality of vertical members 38 coupled between the top member 26 and the bottom member 28.

As described above, the rigid foam layer 50 may be made from preformed panels with the preformed panels being applied to the frame assembly 24. As such, the method may include the step of providing the preformed panels for the rigid foam layer 50. Alternatively, the rigid foam layer 50 may be sprayed, brushed or rolled onto the sheathing layer 56.

While the present invention has been described with reference to an exemplary embodiment, it will be understood by those skilled in the art that various changes may be made and equivalents may be substituted for elements thereof without departing from the scope of the present invention. In addition, many modifications may be made to adapt a particular situation or material to the teachings of the present invention without departing from the essential scope thereof. Therefore, it is intended that the present invention not be limited to the particular embodiment disclosed as the best mode contemplated for carrying out this invention, but that the present invention will include all embodiments falling within the scope of the appended claims.

What is claimed is:

1. A wall assembly comprising:
   a frame assembly including;
      a top member having a top interior surface configured to face an interior of a structure and a top exterior surface configured to face an exterior of the structure,
      a bottom member spaced from said top member with said bottom member having a bottom interior surface configured to face the interior of the structure and a bottom exterior surface configured to face the exterior of the structure, and
      only one row of a plurality of vertical members spaced from each other and coupled to and extending between said top and bottom members with said plurality of vertical members each having a vertical exterior surface configured to face the exterior of the structure;
   a rigid foam layer that is a planar layer directly disposed on said vertical exterior surface of said plurality of vertical members;
   a sheathing layer coupled to said rigid foam layer opposite said plurality of vertical members; and
   an exterior covering coupled to said sheathing layer opposite said rigid foam layer,
   wherein said rigid foam layer comprises a foam selected from the group of polyurethane foams, polyurea foams, and combinations thereof, and
   wherein the sheathing layer is selected from the group consisting of rigid polystyrene, polyurethane, or polyiso insulation, oriented strand board, plywood, fiber board, cementitious board, mineral based board and combinations thereof,
   said sheathing layer is bonded directly to said rigid foam layer such that said rigid foam layer and said sheathing layer form a laminated composite layer,
   said rigid foam layer couples said vertical members between said top and bottom members,
   said wall assembly is free of other fasteners coupling said laminated composite layer to said frame assembly,
   said wall assembly is free of other fasteners coupling said vertical members between said top and bottom members, and
   the other fasteners include nails, screws, adhesives, bolts, cam locks, and straps.

2. A wall assembly as set forth in claim 1 further comprising an inner foam layer bonded to said rigid foam layer opposite said sheathing layer with said inner foam layer extending into said frame assembly.

3. A wall assembly as set forth in claim 2 wherein said inner foam layer at least partially fills voids defined between said vertical members.

4. A wall assembly as set forth in claim 1 wherein said foam of said rigid foam layer is a sprayable foam.

5. A wall assembly as set forth in claim 1 wherein said rigid foam layer between said plurality of vertical members and said sheathing layer has a thickness of from about 0.75 to about 1.5 inches.

6. A wall assembly as set forth in claim 1 further comprising a weather resistant barrier coupled to said sheathing layer opposite said rigid foam layer.

7. A wall assembly as set forth in claim 6 wherein said weather resistant barrier is a fluid applied weather resistant barrier.

8. A wall assembly for supporting an exterior coving of a structure, said wall assembly comprising:
   a frame assembly including;
      a top member having a top interior surface configured to face an interior of a structure and a top exterior surface configured to face an exterior of the structure,
      a bottom member spaced from said top member with said bottom member having a bottom interior surface configured to face the interior of the structure and a bottom exterior surface configured to face the exterior of the structure, and
      only one row of a plurality of vertical members spaced from each other and coupled to and extending between said top and bottom members with said plurality of vertical members each having a vertical exterior surface configured to face the exterior of the structure;
   a rigid foam layer that is a planar layer directly disposed on said vertical exterior surface of said plurality of vertical members, wherein said rigid foam layer comprises a foam selected from the group of polyurethane foams, polyurea foams, and combinations thereof;

a sheathing layer coupled to said rigid foam layer opposite said plurality of vertical members with said sheathing layer configured to receive the exterior covering, wherein the sheathing layer is selected from the group consisting of rigid polystyrene, polyurethane, or polyiso insulation, oriented strand board, plywood, fiber board, cementitious board, mineral based board and combinations thereof, said sheathing layer is bonded directly to said rigid foam layer such that said rigid foam layer and said sheathing layer form a laminated composite layer, said rigid foam layer couples said vertical members between said top and bottom members, said wall assembly is free of other fasteners coupling said laminated composite layer to said frame assembly, said wall assembly is free of other fasteners coupling said vertical members between said top and bottom members, and the other fasteners include nails, screws, adhesives, bolts, cam locks, and straps.

9. A wall assembly as set forth in claim 8 further comprising an inner foam layer bonded to said rigid foam layer opposite said sheathing layer with said inner foam layer extending into the frame assembly.

10. A wall assembly as set forth in claim 9 wherein said inner foam layer at least partially fills voids defined between said vertical members.

11. A wall assembly as set forth in claim 8 wherein said foam of said rigid foam layer is a sprayable foam.

12. A wall assembly as set forth in claim 8 wherein said rigid foam layer between said plurality of vertical members and said sheathing layer has a thickness of from about 0.75 to about 1.5 inches.

13. A wall assembly as set forth in claim 8 further comprising a weather resistant barrier coupled to said sheathing layer opposite said rigid foam layer.

14. A method of manufacturing a wall assembly comprising a frame assembly, a rigid foam layer extending from the frame assembly, a sheathing layer coupled to the rigid foam layer, said method comprising the steps of:

providing the frame assembly including a top member and a bottom member each having an interior surface configured to face an interior of a structure and an exterior surface configured to face an exterior of the structure and only one row of a plurality of vertical members spaced from each other and coupled to and extending between the top and bottom members;

disposing the rigid foam layer directly on a vertical exterior surface of the vertical members of the frame assembly, wherein the vertical exterior surface is configured to face an exterior of a structure, the rigid foam layer is a planar layer, and said rigid foam layer comprises a foam selected from the group of polyurethane foams, polyurea foams, and combinations thereof;

coupling the sheathing layer to the rigid foam layer opposite the frame assembly, wherein the sheathing layer is selected from the group consisting of rigid polystyrene, polyurethane, or polyiso insulation, oriented strand board, plywood, fiber board, cementitious board, mineral based board and combinations thereof, wherein the step of coupling the sheathing layer to the rigid foam layer is further defined as laminating the sheathing layer to the rigid foam layer to produce a laminated composite layer, said rigid foam layer couples said vertical members between said top and bottom members, said wall assembly is free of other fasteners coupling said laminated composite layer to said frame assembly, said wall assembly is free of other fasteners coupling said vertical members between said top and bottom members, and the other fasteners include nails, screws, adhesives, bolts, cam locks, and straps.

15. A method as set forth in claim 14 wherein the step of coupling the rigid foam layer is further defined as coupling the laminated composite layer to the frame assembly.

16. A method as set forth in claim 14 further comprising the step of applying an inner foam layer bonded to the rigid foam layer opposite the sheathing layer with the inner foam layer extending into the frame assembly.

* * * * *